US009154650B2

United States Patent
Tietke et al.

(10) Patent No.: US 9,154,650 B2
(45) Date of Patent: Oct. 6, 2015

(54) METHOD FOR READING DATA FROM A DOCUMENT, READER, DOCUMENT AND ELECTRONIC SYSTEM

(75) Inventors: Markus Tietke, Berlin (DE); Jakob Hille, Berlin (DE); Joerg Fischer, Berlin (DE)

(73) Assignee: BUNDESDRUCKEREI GmbH, Berlin (DE)

( * ) Notice: Subject to any disclaimer, the term of this patent is extended or adjusted under 35 U.S.C. 154(b) by 433 days.

(21) Appl. No.: 13/637,383

(22) PCT Filed: Apr. 1, 2011

(86) PCT No.: PCT/EP2011/055133
§ 371 (c)(1),
(2), (4) Date: Jun. 25, 2013

(87) PCT Pub. No.: WO2011/128216
PCT Pub. Date: Oct. 20, 2011

(65) Prior Publication Data
US 2014/0132995 A1    May 15, 2014

(30) Foreign Application Priority Data

Apr. 12, 2010   (DE) .......................... 10 2010 003853

(51) Int. Cl.
*H04N 1/00*    (2006.01)
*G08B 13/14*   (2006.01)
(Continued)

(52) U.S. Cl.
CPC .......... *H04N 1/00342* (2013.01); *G06K 7/0008* (2013.01); *G06K 7/10297* (2013.01);
(Continued)

(58) Field of Classification Search
None
See application file for complete search history.

(56) References Cited

U.S. PATENT DOCUMENTS 5,136,233 A * 8/1992 Klinkenberg et al. ........ 323/343
5,258,834 A * 11/1993 Tsuji et al. ...................... 348/71
(Continued)

FOREIGN PATENT DOCUMENTS

EP          1801741       6/2007
WO       2006/061001 A1   6/2006
(Continued)

OTHER PUBLICATIONS

Kinneging T A F: "Machine Readable Travel Documents Technical Report PKI for Machine Re", Internet Citation, Oct. 2004, XP002396738, [retrieved on Aug. 29, 2006] sections 2.3.2, 2.4, 2.5.

*Primary Examiner* — Madelein Nguyen
(74) *Attorney, Agent, or Firm* — Leveque IP Law, P.C.

(57) ABSTRACT

The invention relates to a method for reading data (120) from a document (104) using a reader (102), wherein the reader forms the primary side of a transformer (110), wherein the document has an electronic memory (118) for storing the data, processor means (114) for reading the data from the memory and at least one electrical load (128, 130, 132) which can be actuated by the processor means, wherein the document forms the secondary side of the transformer, and wherein the processor means and the at least one load are coupled to the secondary side for the purpose of supplying power, having the following steps: a primary-side voltage (U) is applied to the primary side for the purpose of injecting power into the secondary side, the at least one load is actuated by the processor means, as a result of which a time-variant secondary-side load is formed which prompts the primary-side voltage to undergo modulation, the modulation of the primary-side voltage is evaluated by the reader in order to execute read access for the purpose of reading the data on the basis of a result of the evaluation.

20 Claims, 6 Drawing Sheets

Figure 1A:
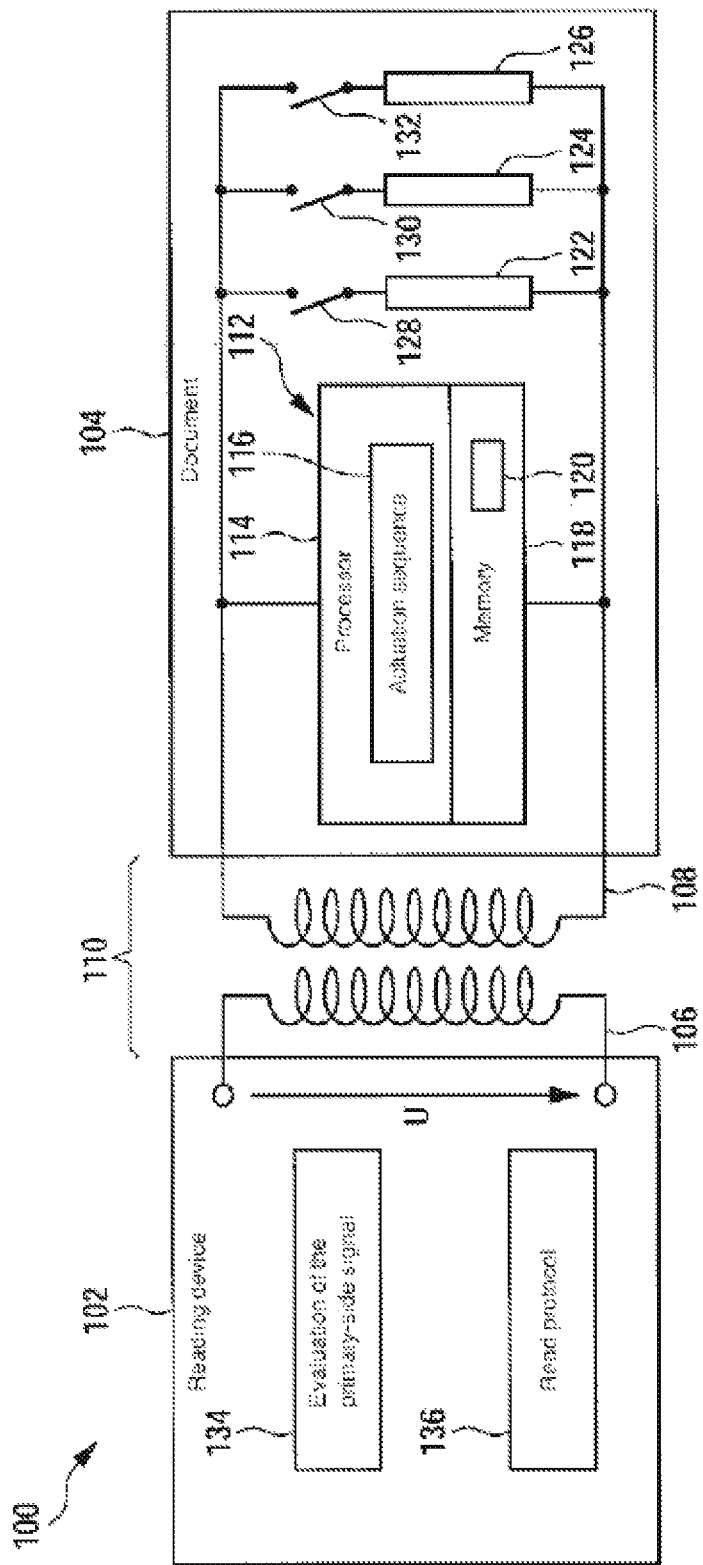

(51) Int. Cl.
*H01F 29/04* (2006.01)
*G06K 7/00* (2006.01)
*G06K 7/10* (2006.01)
*G06K 19/02* (2006.01)
*G06K 19/07* (2006.01)
*G06K 19/073* (2006.01)
*G06K 19/10* (2006.01)

(52) U.S. Cl.
CPC .......... *G06K19/025* (2013.01); *G06K 19/0723* (2013.01); *G06K 19/07309* (2013.01); *G06K 19/10* (2013.01)

(56) References Cited

U.S. PATENT DOCUMENTS

| | | | | |
|---|---|---|---|---|
| 5,581,173 | A * | 12/1996 | Yalla et al. | 323/257 |
| 6,351,105 | B2 * | 2/2002 | Suzuki | 323/255 |
| 6,404,135 | B1 * | 6/2002 | Shino | 315/169.1 |
| 2001/0024111 | A1 * | 9/2001 | Suzuki | 323/255 |
| 2005/0027491 | A1 * | 2/2005 | Fertner et al. | 702/196 |
| 2006/0028178 | A1 * | 2/2006 | Hobbs | 320/128 |
| 2006/0077607 | A1 * | 4/2006 | Henricks et al. | 361/93.1 |
| 2007/0027883 | A1 * | 2/2007 | Cox et al. | 707/100 |
| 2007/0234263 | A1 * | 10/2007 | Cox et al. | 716/11 |
| 2008/0079586 | A1 * | 4/2008 | Rofougaran | 340/572.7 |
| 2010/0179704 | A1 * | 7/2010 | Ozog | 700/291 |
| 2011/0071697 | A1 * | 3/2011 | Torre et al. | 700/295 |
| 2011/0273912 | A1 * | 11/2011 | Kim et al. | 363/21.09 |
| 2012/0124655 | A1 * | 5/2012 | Valin et al. | 726/7 |
| 2012/0319588 | A1 * | 12/2012 | Sid | 315/129 |
| 2013/0140903 | A1 * | 6/2013 | Divan et al. | 307/82 |
| 2014/0086611 | A1 * | 3/2014 | Nakagawa | 399/88 |
| 2014/0103888 | A1 * | 4/2014 | Divan et al. | 323/208 |
| 2014/0132995 | A1 * | 5/2014 | Tietke et al. | 358/434 |
| 2014/0319910 | A1 * | 10/2014 | Divan et al. | 307/20 |

FOREIGN PATENT DOCUMENTS

| | | |
|---|---|---|
| WO | 2007/141338 A2 | 12/2007 |
| WO | 2009/090602 A1 | 7/2009 |

* cited by examiner

METHOD FOR READING DATA FROM A DOCUMENT, READER, DOCUMENT AND ELECTRONIC SYSTEM

A method for accessing an electronic device from a data station is known from EP 1 891 607 B1. The electronic device is a component of a document and contains an allocation table, in which a basis access control (BAC) protocol and/or an extended access control (EAC) protocol is/are assigned to different data objects of the document depending on the degree of protection required by the data object in question. A development of this method is known from WO 2007/141338 A2.

A method for accessing a document from a reading device is known from document DE 10 2009 055 285, which is in the name of the same applicant and was unpublished on the date of application, wherein the document is designed to implement first and second cryptographic protocols, and wherein one of the cryptographic protocols is selected by the document in accordance with the reading device.

In contrast to the above, the problem addressed by the invention is that of creating an improved method for reading data from a document, an improved reading device, an improved document and an improved electronic system.

The problems addressed by the invention are each solved by the features of the independent patent claims. Embodiments of the invention are specified in the dependent patent claims.

Embodiments of the invention concern a method for reading data from a document with the aid of a reading device.

The document may be a paper-based and/or plastic-based document, in particular a value or security document, such as an identification document, in particular a passport, personal identification document, visa or a driver's license, vehicle certificate, vehicle registration document, company identification document, health insurance card or another ID document or a chip card, means of payment, in particular a banknote, bank card or credit card, a consignment note or another proof of authority.

The document has a contact-free communications interface, such as an RFID interface or NFC interface. Besides the transfer of messages between the reading device and the document, the communications interface is also used to supply energy to the document by coupling energy inductively into the document. To this end, the reading device forms the primary side and the document forms the secondary side of a transformer, when the document is located within the range of the reading device.

According to embodiments of the invention, both the reading device and the document each have a transmitting coil and a receiving coil, which are coupled to one another, so that, on the one hand, electrical energy can be inductively coupled into the document from the reading device via the transformer thus formed and, on the other hand, data communication can take place between the reading device and the document via the inductively coupled transmitting and receiving coils.

By applying a primary-side voltage at the primary side, that is to say across the transmitting and receiving coils of the reading device for example, electrical energy is coupled into the secondary side, that is to say into the document, and therefore the processor of the document is supplied with voltage and is activated so that the execution of program instructions by the processor is initiated. The processor actuates the at least one electrical load so as to produce a secondary-side load that varies over time.

Due to the electromagnetic coupling of the transmitting and receiving coils, this secondary-side load that varies over time has a retroactive effect on the primary side, in particular on the primary-side voltage, the primary-side current or the primary-side resonance behavior, that is to say the complex impedance formed by the primary side that experiences a modulation due to the load that varies over time. This modulation is evaluated by the reading device so as to implement read access for the purpose of reading the data, according to a result of the aforesaid evaluation.

According to one embodiment of the invention, a security feature of the document is formed by the modulation of the primary-side voltage due to the secondary-side load that varies over time. To inspect this security feature, the reading device checks whether the modulation of the primary-side voltage meets a predefined criterion on the basis of the secondary-side load that varies over time. The predefined criterion may be a specific modulation pattern and/or a specific piece of information that is received by the reading device on the basis of the modulation. Alternatively or in addition, the type of document can be identified by the reading device on the basis of the modulation of the primary-side voltage and/or a cryptographic key can be derived from a piece of information received by virtue of the modulation, said cryptographic key being necessary for read access.

According to one embodiment of the invention, the primary-side voltage has a frequency of >1 MHz, in particular 13.56 MHz. For example, the document and the reading device are designed to implement an RFID or NFC method for the production of a contact-free communications channel.

According to one embodiment of the invention, a high-frequency carrier wave is generated by the reading device in a first time interval, without a message being sent, however, from the reading device to the document via the carrier wave. By means of the carrier wave, the reading device thus supplies the document with energy by inductive coupling, so that the execution of program instructions by the processor of the document is initiated and the processor actuates the at least one load of the document in accordance with a predefined actuation sequence.

The primary-side voltage is thus modulated during the first time interval, in which the primary—side voltage is applied, as a result of the secondary load, which varies over time. Only once this modulation has been evaluated is a bidirectional communications link formed in a second time interval by an RFID or NFC method between the reading device and the document, provided the evaluation of the modulation meets a specific criterion. In particular, the reading device can then send a read command to the document by the RFID or NFC method via the carrier wave.

According to one embodiment of the invention, the actuation sequence is a switching sequence with which various loads of the document are connected and disconnected in a specific sequence. For example, the loads may be one or more display devices, a biometric sensor, a touch panel and/or touchpad, a temperature sensor, a motion sensor or a camera.

According to one embodiment of the invention, the load is varied by reproducing a sequence of various images on the display device of the document, wherein the various images are designed such that they each lead to a different power consumption of the display device. This is particularly the case for an emissive display device, when images of different brightness are displayed. Due to the successive displays of the various images on the basis of a corresponding actuation of the display device by the processor of the document, the secondary-side load is thus varied, which leads to a corresponding modulation of the primary side, in particular of the primary-side voltage, of the primary-side current or of the primary-side resonance behavior, that is to say of the complex impedance formed by the primary side.

In a further aspect, the invention relates to a reading device having primary-side means for transmitting a carrier wave to inductively couple energy into the document, which forms the secondary side, having means for evaluating a modulation of the carrier wave on the basis of a change to the secondary-side load, and having means for reading data stored in an electronic memory of the document according to a result of the evaluation of the modulation.

In a further aspect, the invention relates to a document having an electronic memory for storing data, processor means for reading the data from the store, at least one electrical load actuatable by the processor means, and a contact-free communications interface for coupling in a carrier wave, wherein the processor means and the at least one load are coupled to the communications interface for energy supply, wherein the processor means are designed to actuate the at least one electrical load in accordance with a predefined actuation sequence so as to vary the load formed by the at least one load. This variation of the load is implemented before a read access is released by the document.

In a further aspect the invention relates to an electronic system, which includes at least one reading device according to the invention and at least one document according to the invention. The electronic system may also include various documents according to the invention of different types, wherein different modulation patterns, which can be used by the reading device to identify the document type, are then generated by the type-specific change over time of the secondary-side load.

According to embodiments of the invention, the modulation of the voltage is evaluated by an analysis of the amplitude curve of the primary-side voltage and/or of the phase curve. This can be achieved by a demodulation, for example with the aid of an envelope receiver of the reading device. Alternatively or in addition, the modulation of the primary-side voltage can be evaluated by the reading device by creating a spectrum of the primary-side voltage, for example by means of fast Fourier transform (FFT) or discrete Fourier transform (DFT). Furthermore, a voltage curve of the envelope can be recorded by a filter, in particular a low-pass filter and/or a high-pass filter. The spectrum or the envelope can then be compared with a reference spectrum or a reference envelope so as to examine the fulfillment of the predefined criterion. For example, if the spectrum/envelope established by the reading device coincides sufficiently with the reference spectrum/reference envelope, the security feature in question is thus deemed to be met.

Figure 1B:
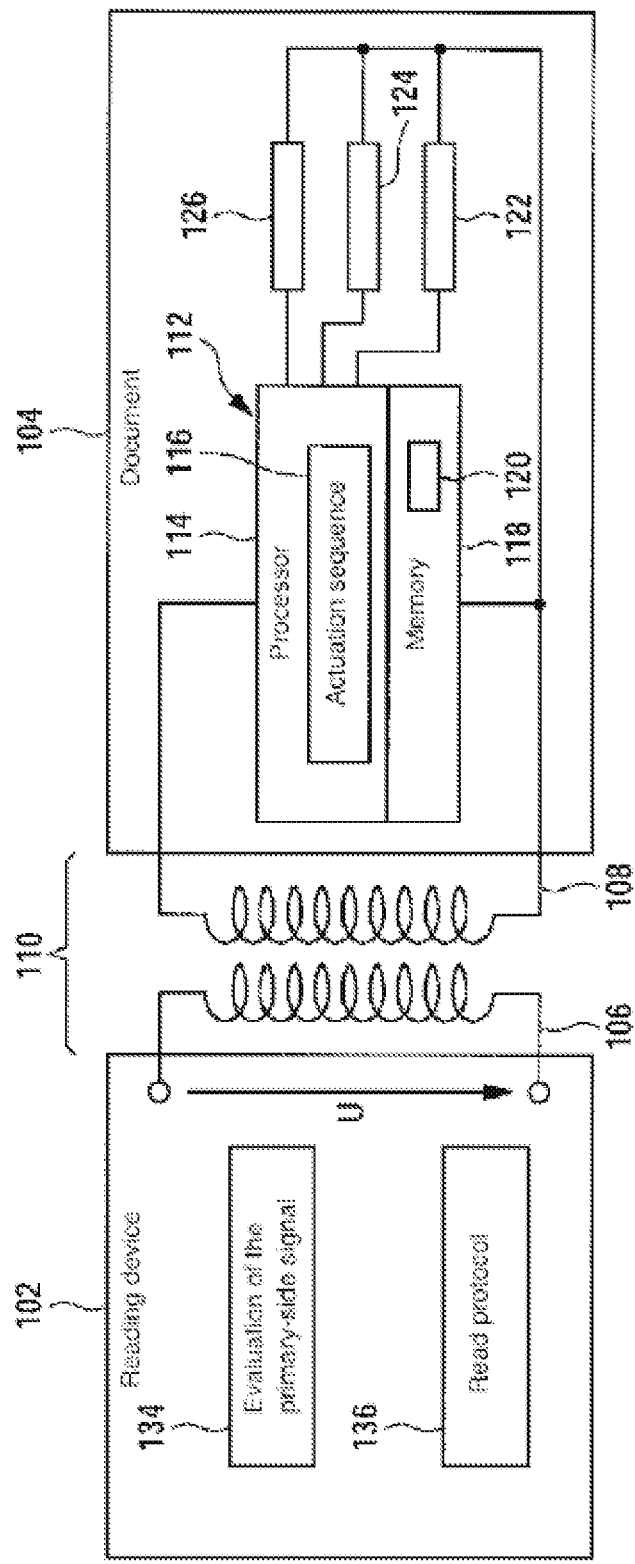
Figure 1C:
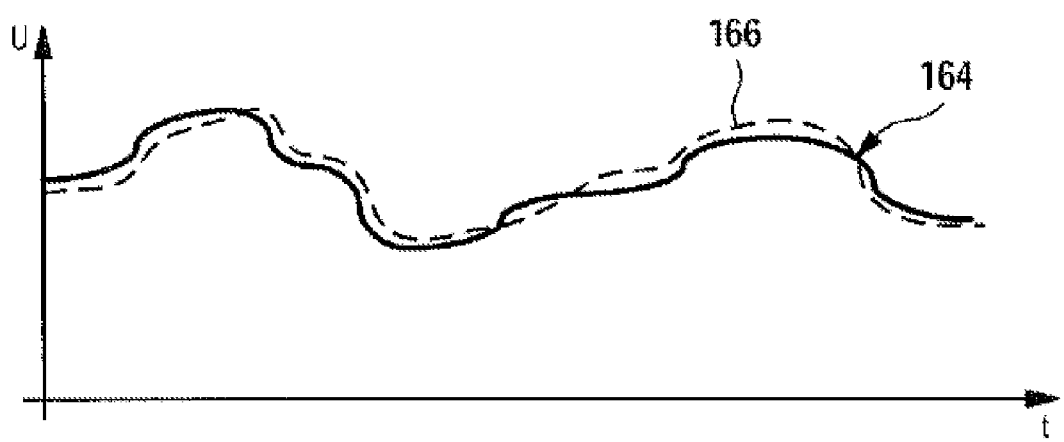
Figure 2:
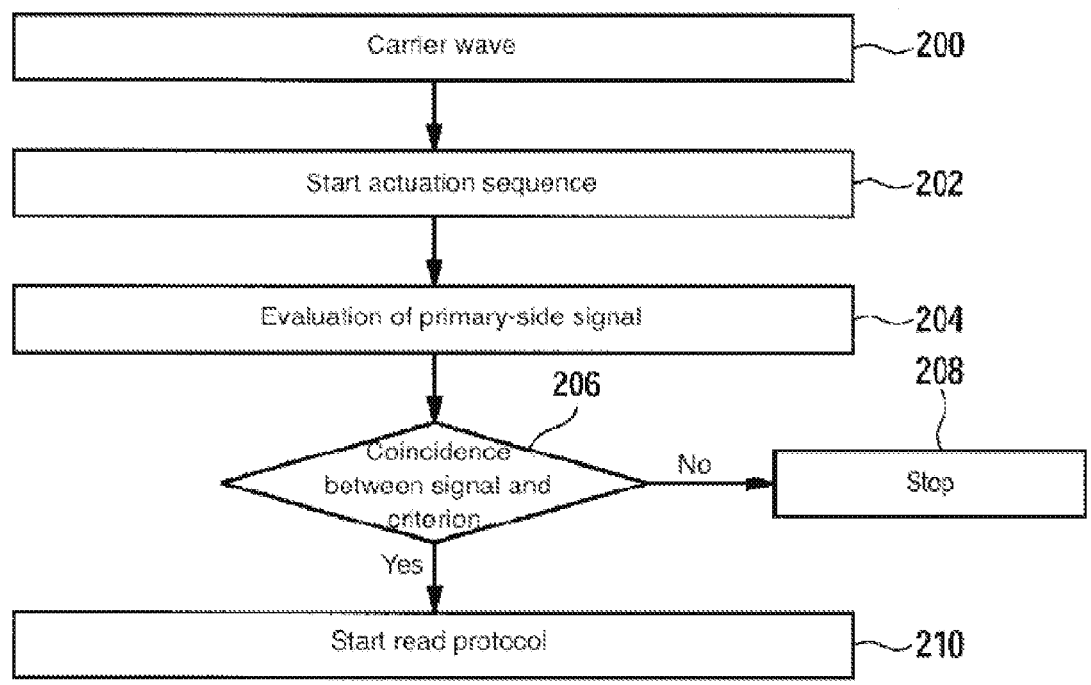
Figure 3:
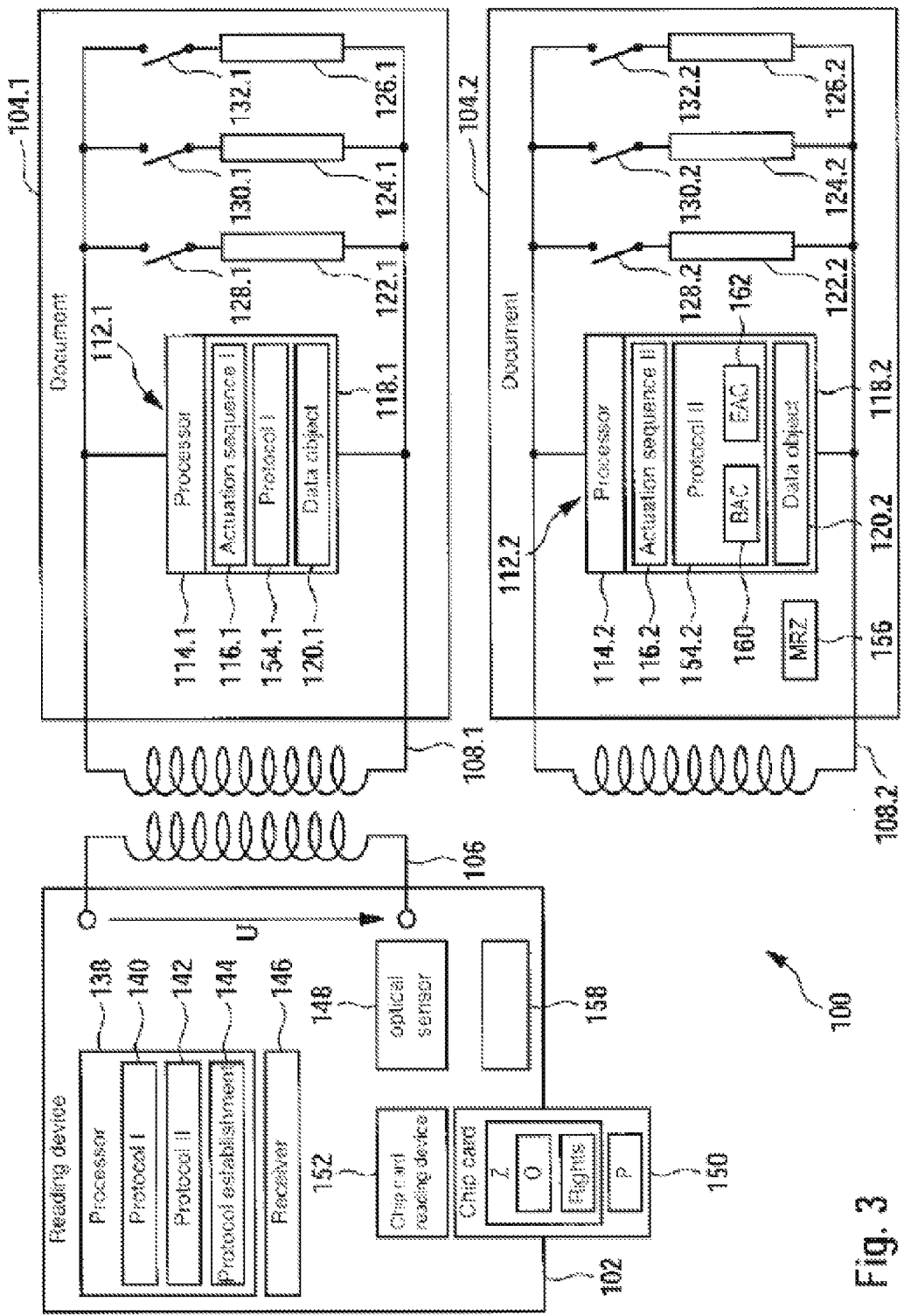
Figure 4:
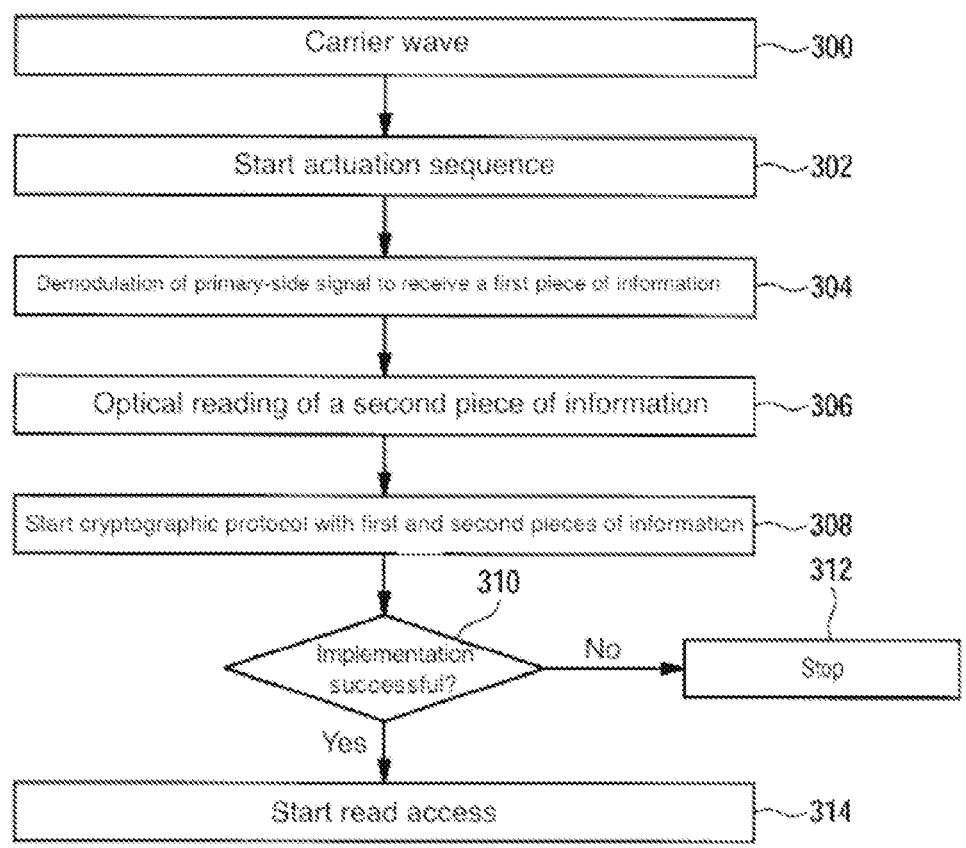

Hereinafter, embodiments of the invention will be explained in greater detail with reference to the drawings, in which:

FIG. 1a shows a block diagram of an embodiment of a reading device, document and electronic system according to the invention, FIG. 1b shows a block diagram of a further embodiment of a reading device, document and electronic system according to the invention, FIG. 1c shows a measured envelope compared to a reference envelope of the primary-side voltage, FIG. 2 shows a flow diagram of an embodiment of a method according to the invention, FIG. 3 shows a block diagram of a further embodiment of a system according to the invention, and FIG. 4 shows a flow diagram of a further embodiment of a method according to the invention.

Hereinafter, corresponding elements in the following embodiments will be identified using the same reference signs.

FIG. 1a shows an electronic system 100 comprising a reading device 102 and a document 104. The reading device 102 has a coil 106 and the document has a coil 108. If the document 104 is located in the range of the reading device 102, the coils 106 and 108 are coupled electromagnetically. As a result of the coupling of the coils 106 and 108, a transformer 110 is thus formed, and in this case is used to inductively couple electrical energy from the reading device 102 into the document 104 and also for message transfer, for example by an RFID method or an NFC method.

The document 104 has an electronic circuit 112, such as an integrated circuit based on a semiconductor chip or a printed polymer electronic circuit. The electronic circuit 112 has a processor 114 for executing program instructions, in particular for executing the program instructions 116, which define an actuation sequence. The electronic circuit 112 further has an electronic memory 118, in which at least one data object 120 for example is stored. The data object 120 may be personal data concerning the owner of the document 104, details concerning the authority that issued the document 104, or another piece of information.

The electronic circuit 112 is connected parallel with the coil 108, and therefore the electronic circuit 112 is supplied with voltage as soon as energy is inductively coupled from the reading device 102 into the coil 108. One or more loads of the document 104 is/are likewise connected in parallel to the coil 108, in the embodiment considered in this instance the loads 122, 124 and 126. The loads can be connected by the processor 114 via switches 128, 130 and 132 respectively. For example, the switches 128, 130 and 132 are switchable semiconductor switches, in particular transistors, via which the processor 114 can connect or disconnect each of the loads as a result of execution of the program instructions 116.

As a result of the reading device 102, a voltage U is applied across the coil 106, for example such as a high-frequency voltage having a frequency of 1 MHz or more, in particular 13.56 MHz. A carrier wave is thus generated, as a result of which energy is inductively coupled into the coil 108.

The reading device 102 has an evaluation unit 134 for evaluating a modulation of the voltage U, which it experiences due to the actuation sequence and the associated secondary-side variation in the load. For example, the evaluation may be implemented such that a spectrum of the modulated voltage U is calculated by the evaluation unit 134 by means of FFT or DFT and is compared with a reference spectrum. Furthermore, a voltage curve of the envelope of the voltage U can be recorded by the evaluation unit 134 and compared with a reference envelope (see FIG. 1c). If the two spectra and/or envelopes coincide with one another sufficiently, the security feature of the document, which is given by the actuation sequence 116 and the loads actuated thereby, is thus deemed to be met.

Depending on the embodiment, this may be a necessary or sufficient precondition for the fact that a read protocol is then implemented by a logic component 136 of the reading device 102 for the purpose of reading the data object 120. To this end, the logic component 136 can generate a read command, which is transferred via the transformer 110 to the document 104, where it is processed by the processor 114. The processor 114 then accesses the memory 118 so as to read out the data object 120 and to generate a response to the read command, with which the data object 120 is transferred to the reading device 102 via the transformer 110.

For example, the loads 122, 124 and 126 may be a display device, a temperature sensor, a motion sensor, a fingerprint sensor, or a camera for recording an iris scan.

According to embodiments of the invention, the display device integrated into the document is a bistable display device, an electrophoretic display, an electrochromic display, a liquid crystal display (LCD), an LED display, in particular an inorganic LED display or organic LED display (OLED), a rotating element display, a bar-type display, a photoluminescence quenching display or a display based on the electrowetting effect, or a hybrid display. The display device can be designed as a matrix display, in particular as an emissive matrix display.

The evaluation unit 134 and the logic component 136 may be formed by one or more microprocessors of the reading device 102 and corresponding program modules and/or logic circuits. The same applies accordingly to the implementation of the actuation sequence, which may likewise be implemented completely or in part in a program-controlled manner and/or via a fixedly wired logic.

FIG. 1b shows an embodiment in which the loads 122, 124 and 126 are each connected directly via one of their terminals to the processor 112. The supply voltage is then applied via one of the loads, that is to say between the processor 114 and a voltage tap of the coil 108, as illustrated in FIG. 1b. The separate switches 128, 130, 132 can be omitted in this embodiment, since the processor 114 can connect the voltage internally to its outputs, to which the loads 122, 124 and 126 are connected.

FIG. 1c shows a reference envelope 164, which is stored in the reading device 102, such as in the evaluation unit 134 (see the embodiments in FIG. 1a and FIG. 1b). The reading device may have an envelope receiver, which is coupled to the coil 106, so as to establish an envelope 166 of the temporal progression of the voltage U, as shown in FIG. 1c by dashed lines. If the actual progression of the envelope curve 166 coincides sufficiently with the progression of the reference curve 164, a predefined criterion is thus met; for example, a security feature of the document is therefore deemed to be met, or a document type assigned to the reference curve 164 is deemed as being identified.

FIG. 2 shows a corresponding flow diagram. In step 200, the reading device 102 emits a carrier wave by application of the high-frequency voltage U, as a result of which energy is inductively coupled into the document 104. A supply voltage is thus applied to the electronic circuit 112, as a result of which the execution of the program instructions 116 by the processor 114 is initiated (step 202), since an oscillator of the circuit 112 starts to oscillate due to the applied voltage. Due to the execution of the program instructions 116, the loads 122, 124 and 126 are then actuated in a temporal sequence, so as to vary the secondary-side load, which the document 104 forms for the reading device 102. For example, the switches 128, 130 and 132 are thus closed in succession and then opened again in succession, more specifically in a sequence predefined by the program instructions 116. As a result of this temporal variation of the secondary-side load, the amplitude and/or the phase of the voltage U is modulated, which is evaluated by the evaluation unit 134 (step 204). If this modulation of the voltage U corresponds to a predefined criterion (step 206), the execution of the reading protocol by the logic component 136 is initiated by the reading device 102, such that the reading device 102 sends a read command to the document 104 via the transformer so as to obtain read access to the data object 120 (step 210). If read access is denied, the procedure is abandoned in step 208.

FIG. 3 shows a further embodiment of an electronic system 100 according to the invention, wherein the reading device 102 in this embodiment has a processor 138 for executing program instructions 140, 142 and 144.

The program instructions 140 implement the steps concerning the reading device 102 of a first cryptographic protocol I, whereas the program instructions 142 implement the steps concerning the reading device 102 of a second cryptographic protocol II. The processor 138 is further used to execute the program instructions 144, which are used to select one of the cryptographic protocols supported by the reading device 102, that is to say protocols I or II in this instance.

The reading device 102 further has a receiver 146 for demodulating the voltage U. For example, the receiver 146 obtains information by demodulating the voltage U and transfers this information to the processor 138 for protocol establishment by means of the program instructions 144.

The reading device 102 may further have an optical sensor 148, for example a scanner for reading a machine readable zone (MRZ). The reading device 102 may further contain a security token or may access a security token (such as a chip card 150 for example) via a chip card reading device 152. Cryptographic key material for implementing one of the protocols supported by the reading device 102 may be stored in the chip card 150, such as a private key P and a certificate Z of a public key infrastructure (PKI), which contains the public key O belonging to the private key P as well as a specification of access rights.

The document 104.1 and the document 104.2, which are formed so as to be structurally similar, but have different document types, also belong to the electronic system 100.

The processor 114.1 of the document 104.1 is used to execute program instructions 116.1, which implement a first actuation sequence I of the first document type. By contrast, the processor 114.2 of the document 104.2 is used to implement the program instructions 116.2, which implement a second actuation sequence II of the second document type.

For example, the actuation sequences I and II may differ in terms of the switching sequence in which the switches 128.1, 130.1 and 132.1 and the switches 128.2, 130.2 and 132.2 are switched. For example, the switches 128.1, 130.1 and 132.1 are closed in succession in this sequence in accordance with actuation sequence I, whereas the switches 132.2, 130.2 and 128.2 are in closed in this sequence in accordance with actuation sequence II. The document types may also differ in terms of the number, type and size of the load of the loads 122.1, 124.1, 126.1 and 122.2, 124.2 and 126.2. In particular, the loads may have different real or imaginary, that is to say inductive or capacitive, proportions.

The processor 114.1 is also used to execute program instructions 154.1, as a result of which the steps concerning the document 104.1 of cryptographic protocol I are implemented. By contrast, the processor 114.2 is used to execute program instructions 154.2, as a result of which the steps concerning the document 104.2 of a cryptographic protocol II are implemented. Different data objects 120.1 and 120.2 may be stored in the memories 118.1 and 118.2 respectively of the documents 104.1 and 104.2.

The document 104.2 additionally carries a machine readable zone (MRZ), for example as specified by the international civil aviation authority (ICAO), more specifically in the form of an optically readable imprint 156.

In the embodiment considered in this instance, the protocol I is a password-based Diffie-Hellman key agreement protocol, for example the PACE protocol specified by the German Federal Office for Security in Information Technology. The reading device 118 accordingly has an interface, in particular a keyboard 158, for inputting a password (PW).

By contrast, the protocol II in this case implements both a basis access control protocol and an extended access control protocol, for example as specified by the ICAO. The program instructions 154.2 therefore contain program instructions 160 for implementing the steps concerning the document 104.2 of the basis access control protocol as well as program instructions 162 for implementing the steps concerning the document 104.2 of the extended access control protocol.

Likewise, in the case of the reading device 102, the program instructions 140 thereof contain the steps concerning the reading device 102 of the protocol I, that is to say for example of the PACE protocol, and the program instructions 142 thereof contain the steps concerning the reading device 102 of the basis access control protocol and of the extended access control protocol.

If the document 104.1 is brought into the range of the reading device 102, energy is thus coupled into the document 104.1 as a result of the carrier wave generated by application of the primary-side voltage U, and the execution of the program instructions 116.1 is initiated, such that the switches 128.1, 130.1 and 132.1 are opened and closed in the sequence given by the actuation sequence I, such that a secondary-side load that varies over time is produced, which leads to a corresponding modulation of the voltage U. This modulation of the voltage U characteristic for document type I indicates to the reading device 102 that the document 104.1 is a document of the first document type. To this end, the voltage U is demodulated by the receiver 146 so that the reading device 102 receives a specific pattern, which is evaluated by execution of the program instructions 144. For example, the received pattern is compared with reference patterns of document types I and II and, if the received pattern coincides with the reference pattern of the first document type, the execution of the program instructions 140 is selected.

The execution of the program instructions 140 and 154.1 is then initiated so as to implement protocol I. To this end, the user must input his password via the keyboard 158. Once protocol I has been implemented successfully, the data object 120.1 is read out from the memory 118.1 and is transferred from the document 104.1 to the reading device 102.

The same is true for the document 104.2, when this is brought into the range of the reading device 102 instead of the document 104.1. Due to the actuation sequence II, which then proceeds, the reading device 102 receives a different pattern, which leads to the identification of protocol II. With the aid of the optical sensor 148 of the reading device 102, the MRZ, that is to say the imprint 156, is then read, from which a symmetrical key is derived.

This symmetrical key is transferred from the reading device 102 to the document 104.2 and is compared with a reference value by executing the program instructions 160. If the received symmetrical key coincides with the reference value, the EAC is then implemented by execution of the program instructions 162. To this end, the reading device 102 must authenticate itself to the document 104.2 with the aid of the chip card 150, for example in accordance with what is known as a "challenge response protocol". In addition, the certificate Z must be transferred from the reading device 102 to the document 104.2, so that, by executing the program instructions 162, it can be checked whether the reading device 102 has the rights required to access the data object 120.2. If the EAC has also been executed successfully, the data object 120.2 is read from the memory 118.2 and is transferred to the reading device 102.

In the embodiment considered in this instance, it is particularly advantageous that not only is a security feature given by the actuation sequences I and II, but also the possibility for the reading device 102 to identify the respective document type without the reading device having to send a command or other data; by contrast, merely the application of the voltage U is sufficient to dispatch the carrier wave for this purpose. Only after identification of the respective document type can a type-specific communication be implemented between the reading device 102 and the respective document. It is particularly advantageous that different document types can be read using the reading device 102.

FIG. 4 shows a flow diagram of a further embodiment of a method according to the invention. In step 300, a carrier wave is emitted on the primary side by the reading device. If an embodiment of a document according to the invention is brought into the range of the reading device, the execution of the predefined actuation sequence is thus initiated by the processor of the document, such that a secondary-side load that varies over time is produced.

As a result of this temporal variation, a first piece of information is modulated onto the primary-side voltage U, which is received by demodulation in step 304 by the reading device. A second piece of information, for example the MRZ of the document, is further read by means of the optical sensor of the reading device (see optical sensor 148 of the reading device in the embodiment according to FIG. 3).

In step 308, a cryptographic protocol is initiated, wherein the first and second pieces of information are used to implement the cryptographic protocol. For example, the first piece of information and the second piece of information are concatenated and subjected to a bit-wise XOR operation, or are combined with one another in a different way. The resultant information can be used for example to derive a symmetrical key by execution of the cryptographic protocol. This symmetrical key is transferred from the reading device to the document, where it is compared with a reference value. If there is no coincidence, the cryptographic protocol is deemed to have been implemented unsuccessfully (step 310) and the procedure is abandoned in step 312. If the opposite occurs, the document thus signals to the reading device that the cryptographic protocol has been implemented successfully, and read access to the data stored in the memory of the document is then implemented by the reading device.

For example, the BAC can thus be extended such that not only is information detected optically from the MRZ, but information is also additionally received by the document due to the temporal variation of the load. These pieces of information are linked together and then form the basis for the further implementation of the protocol. Due to this extension, the BAC retains its original function, since the optical reading of the MRZ is mandatory, and is also made more secure, since besides the reading of the MRZ, the receipt of the first piece of information is also necessary due to the modulation of the load.

LIST OF REFERENCE SIGNS

100 Electronic system
102 Reading device
104 Document
106 Coil
108 Coil
110 Transformer
112 Electronic circuit
114 Processor
116 Program instructions 118 Electronic memory
120 Data object
122 Load
124 Load
126 Load
128 Switch
130 Switch
132 Switch
134 Evaluation unit
136 Logic component
138 Processor
140 Program instructions
142 Program instructions
144 Program instructions
146 Receiver
148 Optical sensor
150 Chip card
152 Chip card reading device
154 Program instructions
156 Imprint
158 Keyboard
160 Program instructions
162 Program instructions

The invention claimed is:

1. A method for reading data from a document with the aid of a reading device, wherein the primary side of a transformer is formed by the reading device, wherein the document has an electronic memory for storing the data, a processor for reading the data from the memory, and at least one electrical load actuatable by the processor, wherein the secondary side of the transformer is formed by the document, and wherein the processor and the at least one load are coupled to the secondary side for energy supply, said method comprising:
applying a primary-side voltage to the primary side to couple energy into the secondary side;
actuating the at least one load via the processor, whereby a secondary-side load that varies over time is formed, as a result of which the primary side experiences a modulation; and
evaluating the modulation of the primary side by the reading device so as to execute a read access for the purpose of reading the data, according to a result of the evaluation,
wherein evaluating the modulation of the primary side comprises demodulating the modulated primary-side voltage, the modulated primary-side current, or the modulated primary-side complex impedance so as to receive a first piece of information from the document, and
wherein reading the data is executed dependent on the first piece of information.

2. The method according to claim 1, wherein the primary-side voltage has a frequency of more than 1 MHz.

3. The method according to claim 1, wherein a high-frequency carrier wave is generated by the primary-side voltage to send a read command from the reading device to the document, wherein the read command is only sent once the modulation has been evaluated.

4. The method according to claim 1, wherein, once the modulation has been evaluated, a communications link is formed between the reading device and the document by an RFID method or an NFC method so as to read out the data from the document.

5. The method according to claim 1, wherein the actuating actuation sequence is a switching sequence for switching the loads.

6. The method of claim 1, wherein the document contains one or more of the following loads: display device, fingerprint sensor, iris scan sensor, touch panel, touchpad, temperature sensor, motion sensor, and camera.

7. A method for reading data from a document with the aid of a reading device, wherein the primary side of a transformer is formed by the reading device, wherein the document has an electronic memory for storing the data, a processor for reading the data from the memory, and at least one electrical load actuatable by the processor, wherein the secondary side of the transformer is formed by the document, and wherein the processor and the at least one load are coupled to the secondary side for enemy supply, the method comprising:
applying a primary-side voltage to the primary side to couple enemy into the secondary side;
actuating the at least one load via the processor, whereby a secondary-side load that varies over time is formed, as a result of which the primary side experiences a modulation; and
evaluating the modulation of the primary side by the reading device so as to execute a read access for the purpose of reading the data, according to a result of the evaluation,
wherein the load is a display device, and wherein the actuating contains a sequence for actuating the display device for playing back various images, for each of which a different power consumption of the display device is necessary.

8. A method for reading data from a document with the aid of a reading device, wherein the primary side of a transformer is formed by the reading device, wherein the document has an electronic memory for storing the data, a processor for reading the data from the memory, and at least one electrical load actuatable by the processor, wherein the secondary side of the transformer is formed by the document, and wherein the processor and the at least one load are coupled to the secondary side for enemy supply, the method comprising:
applying a primary-side voltage to the primary side to couple energy into the secondary side;
actuating the at least one load via the processor in accordance with a predefined actuation sequence, whereby a secondary-side load that varies over time is formed, as a result of which the primary side experiences a modulation; and
evaluating the modulation of the primary side by the reading device so as to execute a read access for the purpose of reading the data, according to a result of the evaluation,
wherein the document contains one or more of the following loads: display device, fingerprint sensor, iris scan sensor, touch panel, touchpad, temperature sensor, motion sensor, and camera.

9. The method according to claim 1, wherein, to evaluate the modulation, a comparison with a predefined criterion is made, wherein a precondition for the implementation of the read access is that the predefined criterion is met.

10. A method for reading data from a document with the aid of a reading device, wherein the primary side of a transformer is formed by the reading device, wherein the document has an electronic memory for storing the data, a processor for reading the data from the memory, and at least one electrical load actuatable by the processor, wherein the secondary side of the transformer is formed by the document, and wherein the processor and the at least one load are coupled to the secondary side for energy supply, the method comprising:
applying a primary-side voltage to the primary side to couple energy into the secondary side;

actuating the at least one load via the processor, whereby a secondary-side load that varies over time is formed, as a result of which the primary side experiences a modulation; and evaluating the modulation of the primary side by the reading device so as to execute a read access for the purpose of reading the data, according to a result of the evaluation, wherein the document has a first or a second document type, wherein, by evaluating the modulation, the document type is identified and, depending on the identified document type, the read access is implemented.

11. The method according to claim 10, wherein, once the first document type has been identified, a first cryptographic protocol has to be implemented successfully so as to be able to implement the read access, and wherein, once the second document type has been identified, a second cryptographic protocol has to be implemented so as to be able to implement the read access.

12. A method for reading data from a document with the aid of a reading device, wherein the primary side of a transformer is formed by the reading device, wherein the document has an electronic memory for storing the data, a processor for reading the data from the memory, and at least one electrical load actuatable by the processor, wherein the secondary side of the transformer is formed by the document, and wherein the processor and the at least one load are coupled to the secondary side for energy supply, the method comprising:

applying a primary-side voltage to the primary side to couple energy into the secondary side;

actuating the at least one load via the processor, whereby a secondary-side load that varies over time is formed, as a result of which the primary side experiences a modulation; and evaluating the modulation of the primary side by the reading device so as to execute a read access for the purpose of reading the data, according to a result of the evaluation, wherein, by evaluating the modulation, a first predetermined piece of information is received by the reading device, wherein the document carries an optically readable second piece of information, wherein the second piece of information is read with the aid of an optical sensor of the reading device and a key for enabling implementation of the read access is derived from the first and second pieces of information.

13. A reading device for a document, comprising:
a primary-side component capable of transmitting a carrier wave to inductively couple energy into the document, which forms a secondary side;
an evaluation component capable of evaluating a modulation of the carrier wave due to a change in the secondary-side load; and
a reading component capable of reading data stored in an electronic memory of the document, according to a result of the evaluation of the modulation, wherein the evaluation component is designed for a demodulation of the modulated primary-side voltage, the modulated primary-side current, or the modulated primary-side complex impedance, so as to receive a first piece of information from the document, wherein, depending on the first piece of information, a read access can be implemented by the reading component.

14. The reading device according to claim 13, wherein the reading component is designed to form a communications link to the document by an RFID method or an NFC method so as to receive the data from the document via the communications link.

15. The reading device according to claim 13, wherein the evaluation component is designed to check whether a predefined criterion is met in terms of the modulation.

16. The reading device according to claim 13, wherein the evaluation component is designed to identify the document type, according to the modulation.

17. The reading device according to claim 13, further comprising an optical sensor for reading a second piece of information from the document and a derivation component capable of deriving a cryptographic key from the first piece of information and from the second piece of information, wherein the reading component is designed to implement the read access with the aid of the cryptographic key.

18. An electronic system comprising a reading device according to claim 13 and at least one document comprising an electronic memory for storing data, a processor for reading the data from the memory, at least one electrical load actuatable by the processor, and a contact-free communications interface for coupling in a carrier wave, wherein the processor and the at least one load are coupled to the communications interface for energy supply, wherein the processor is designed to actuate the at least one electrical load in accordance with a predefined actuation sequence so as to vary the load formed by said at least one electrical load.

19. A document comprising:
an electronic memory for storing data, a processor for reading the data from the memory;
at least one electrical load actuatable by the processor; and
a contact-free communications interface for coupling in a carrier wave,
wherein the processor and the at least one electrical load are coupled to the communications interface for energy supply,
wherein the processor is designed to actuate the at least one electrical load in accordance with a predefined actuation sequence so as to vary the load formed by said at least one electrical load, and
wherein the at least one electrical load comprises at least one of the following: a display device, a fingerprint sensor, an iris scan sensor, a touch panel and a touchpad.

20. The document according to claim 19, wherein the at least one electrical load comprises a plurality of electrical loads actuated in the predefined actuation sequence.

* * * * *

UNITED STATES PATENT AND TRADEMARK OFFICE
CERTIFICATE OF CORRECTION

PATENT NO.        : 9,154,650 B2
APPLICATION NO.   : 13/637383
DATED             : October 6, 2015
INVENTOR(S)       : Markus Tietke et al.

Page 1 of 1

It is certified that error appears in the above-identified patent and that said Letters Patent is hereby corrected as shown below:

In The Claims
Column 10, line 36 the word "enemy" should be "energy" in claim 8.

Signed and Sealed this
Eighth Day of March, 2016

Michelle K. Lee
*Director of the United States Patent and Trademark Office*